(12) United States Patent  
Sijbers et al.

(10) Patent No.: US 10,859,511 B2
(45) Date of Patent: Dec. 8, 2020

(54) MOBILE IMAGING OF AN OBJECT USING PENETRATING RADIATION

(71) Applicant: UNIVERSITEIT ANTWERPEN, Antwerp (BE)

(72) Inventors: Jan Sijbers, Duffel (BE); Jan Jozef Victor De Beenhouwer, Geraardsbergen (BE)

(73) Assignee: UNIVERSITEIT ANTWERPEN, Antwerp (BE)

( * ) Notice: Subject to any disclaimer, the term of this patent is extended or adjusted under 35 U.S.C. 154(b) by 63 days.

(21) Appl. No.: 16/093,275

(22) PCT Filed: Apr. 6, 2017

(86) PCT No.: PCT/EP2017/058270
§ 371 (c)(1),
(2) Date: Oct. 12, 2018

(87) PCT Pub. No.: WO2017/178334
PCT Pub. Date: Oct. 19, 2017

(65) Prior Publication Data
US 2019/0145912 A1 May 16, 2019

(30) Foreign Application Priority Data

Apr. 15, 2016 (GB) .................................. 1606640.9

(51) Int. Cl.
*G01N 23/04* (2018.01)
*G01N 23/046* (2018.01)
*G01V 5/00* (2006.01)

(52) U.S. Cl.
CPC ........... *G01N 23/04* (2013.01); *G01N 23/046* (2013.01); *G01V 5/0008* (2013.01);
(Continued)

(58) Field of Classification Search
CPC ......... H01L 27/14683; H01L 27/14687; H01L 2224/18; H01L 2224/24;
(Continued)

(56) References Cited

U.S. PATENT DOCUMENTS

| 8,194,822 B2 | 6/2012 | Rothschild et al. |
| 2012/0093287 A1 | 4/2012 | Singh |

FOREIGN PATENT DOCUMENTS

| CN | 105302141 A | 2/2016 |
| WO | 2009065601 A1 | 5/2009 |
| WO | 2014086837 A1 | 6/2014 |

OTHER PUBLICATIONS

Great Britain Search report from GB Application No. 1606640.9, dated Jul. 14, 2016.
(Continued)

*Primary Examiner* — Irakli Kiknadze
(74) *Attorney, Agent, or Firm* — Workman Nydegger (57) ABSTRACT

A system for imaging a target object comprises a first unmanned vehicle including a source of penetrating radiation. The first vehicle positions the source such as to direct the radiation toward the target object. A second unmanned vehicle comprises an image detector for registering a spatial distribution of the radiation as an image, in which the second vehicle positions the detector to register the distribution of radiation when transmitted through the target object. These unmanned vehicles are autonomous vehicles adapted for independent propelled motion, and comprise a positioning unit for detecting a position of the vehicle. A processing unit controls the motion of the unmanned vehicles to acquire at least two images corresponding to at least two different projection directions of the radiation through the target object. The processing unit is adapted for generating data representative of an internal structure of the target object from the at least two images.

15 Claims, 2 Drawing Sheets

(52) U.S. Cl.
    CPC ............... *G01N 2223/1016* (2013.01); *G01N 2223/308* (2013.01); *G01N 2223/3303* (2013.01)

(58) Field of Classification Search
    CPC ....... H01L 2224/24137; H01L 2224/82; H01L 27/14609; H01L 27/14621; H01L 27/14636; H01L 2924/0002; H01L 2924/3512; H01L 2924/00; G01N 23/04; G01N 2223/628; G01N 23/083; G01N 23/18; G01N 2223/1016; G01N 2223/308; G01N 2223/3303; G01N 23/046; G01N 23/02; H05G 1/20; H05G 1/56; G01V 5/0008; G01V 5/0066; G01V 5/0016; G01M 17/00
    USPC .............................................. 378/57, 58, 62
    See application file for complete search history.

(56) References Cited

OTHER PUBLICATIONS

International Search Report from PCT Application No. PCT/EP2017/058270, dated Jun. 7, 2017.
Gonzalez-Ruiz et al., "An Integrated Framework for Obstacle Mapping With See-Through Capabilities Using Laser and Wireless Channel Measurements," IEEE Sensors Journal, vol. 14, No. 1, Jan. 2014, pp. 25-38.
Mostofi, "Cooperative Wireless-Based Obstacle/Object Mapping and See-Through Capabilities in Robotic Networks," IEEE Transactions on Mobile Computing, vol. 12, No. 5, May 2013, pp. 817-829.
Bleichrodt et al., "An Alignment Method for Fan Beam Tomography," Research Gate, Jul. 2013, 5 Pages.
Dabravolski, "Towards In Loco X-Ray Computed Tomography," Universiteit Antwerpen, 2015, 97 Pages.

MOBILE IMAGING OF AN OBJECT USING PENETRATING RADIATION

FIELD OF THE INVENTION

The invention relates to the field of mobile radiation imaging. More specifically it relates to a system and method for imaging a target object, and a related computer program product.

BACKGROUND OF THE INVENTION

The U.S. Pat. No. 8,194,822 describes systems and methods for inspecting an object with a scanned beam of penetrating radiation. Scattered radiation from the beam is detected, in either a backward or forward direction. Characteristic values of the scattered radiation are compared to expected reference values to characterize the object.

However, a need exists in the art for flexible, unmanned systems for inspecting objects. An autonomous system for imaging objects could be particularly advantageous in hazardous environments, confined spaces and difficult to reach spaces. It may furthermore be advantageous to provide an imaging solution that can autonomously detect and image objects in a volume of space without substantial intervention of an operator.

SUMMARY OF THE INVENTION

It is an object of embodiments of the present invention to provide good and efficient means and methods for imaging target objects.

The above objective is accomplished by a method and device according to the present invention.

Embodiments of the present invention relate, in a first aspect, to a system for imaging a target object. The system comprises a first unmanned vehicle that comprises a source of penetrating radiation, e.g. an X-ray tube or a gamma radiation source. The first unmanned vehicle is adapted for positioning the source such as to direct the penetrating radiation toward the target object. The system further comprises a second unmanned vehicle that comprises an image detector for registering a spatial distribution of this penetrating radiation as an image.

The first unmanned vehicle and the second unmanned vehicle are autonomous vehicles adapted for independent propelled motion. Each of the first and the second unmanned vehicle comprises a positioning unit for detecting a position of the corresponding vehicle, e.g. of the unmanned vehicle in which the positioning unit is comprised.

The system further comprises a processing unit for controlling the propelled motion of the first unmanned vehicle and the second unmanned vehicle such as to acquire at least two images using the image detector corresponding to at least two different projection directions of the penetrating radiation through the target object. For example, the processing unit may be adapted for controlling the propelled motion of the first unmanned vehicle to position the source such as to direct the penetrating radiation toward the target object, and for controlling the propelled motion of the second unmanned vehicle to position the image detector such as to register the spatial distribution of the penetrating radiation when transmitted through the target object.

The processing unit is furthermore adapted for generating data representative of an internal structure of the target object from these at least two images.

It is an advantage of embodiments of the present invention that a target object in a difficult to reach location may be imaged efficiently.

It is an advantage of embodiments of the present invention that objects to be imaged may be detected and imaged automatically without requiring prior knowledge of their exact position.

It is an advantage of embodiments of the present invention that objects may be easily and safely imaged in a hazardous environment.

In a system in accordance with embodiments of the present invention, the first unmanned vehicle and/or the second unmanned vehicle may comprise a propulsion system for providing the propelled motion and a power source for sustaining the propelled motion.

In a system in accordance with embodiments of the present invention, the first unmanned vehicle and/or the second unmanned vehicle may be a ground vehicle, e.g. a wheeled vehicle, a aerial vehicle, a space craft, a watercraft and/or a submersible vehicle.

In a system in accordance with embodiments of the present invention, the positioning unit may comprise an indoor positioning system and/or an outdoor positioning system.

In a system in accordance with embodiments of the present invention, the positioning unit may use laser positioning and/or echo positioning to measure a distance with respect to objects in its vicinity.

In a system in accordance with embodiments of the present invention, the positioning unit may be adapted for determining a relative position of the unmanned vehicle in which it is comprised with respect to the target object and/or the other unmanned vehicle.

In a system in accordance with embodiments of the present invention, the source of penetrating radiation may comprise an X-ray tube and/or a gamma radiation source.

In a system in accordance with embodiments of the present invention, the first unmanned vehicle may comprise a pivotable support for allowing a rotation of the source and/or the second unmanned vehicle may comprise a pivotable support for allowing a rotation of the image detector.

In a system in accordance with embodiments of the present invention, the processing unit may be, fully or in part, integrated in the first unmanned vehicle, in the second unmanned vehicle and/or in a separate base station, e.g. in a base station.

In a system in accordance with embodiments of the present invention, the processing unit may be adapted for receiving position information from the first unmanned vehicle and/or from the second unmanned vehicle.

In a system in accordance with embodiments of the present invention, the positioning unit may be adapted for determining the position of the target object when present, in which the first unmanned vehicle and/or the second unmanned vehicle may be adapted for transmitting an indicative position of the target object to the processing unit when the presence of the target object is detected by the positioning unit.

In a system in accordance with embodiments of the present invention, the processing unit may be adapted for controlling the independent propelled motion of the first unmanned vehicle and the second unmanned vehicle such as to acquire the at least two images, using the image detector, corresponding to the at least two different projection directions of the penetrating radiation through the target object, in which the at least two different projection directions are determined by the processing unit as a uniform angular sampling around the target object.

In a system in accordance with embodiments of the present invention, the processing unit may be adapted for generating the data representative of the internal structure of the target object by performing a tomographic reconstruction.

In a system in accordance with embodiments of the present invention, this tomographic reconstruction may comprise a partial reconstruction taking a first plurality of images into account. The processing unit may furthermore be adapted for determining a further projection direction for acquiring a further image of the target object by taking this partial reconstruction into account.

In a system in accordance with embodiments of the present invention, the tomographic reconstruction may be performed by the processing unit using a discrete algebraic reconstruction method.

In a system in accordance with embodiments of the present invention, the tomographic reconstruction may comprise a compensation method for taking unpredictable variations in positioning of the first unmanned vehicle, of the second unmanned vehicle and/or of the target object into account.

In a second aspect, embodiments of the present invention relate to a method for imaging a target object. This method comprises providing a first unmanned vehicle that comprises a source of penetrating radiation, and providing a second unmanned vehicle that comprises an image detector for registering a spatial distribution of this penetrating radiation as an image. The first unmanned vehicle and the second unmanned vehicle are autonomous vehicles adapted for independent propelled motion. Each of the first and the second unmanned vehicle comprises a positioning unit for detecting a position of the corresponding vehicle.

The method further comprises controlling, using a processing unit, the propelled motion of the first unmanned vehicle to position the source such as to direct the penetrating radiation toward the target object, and controlling, using the processing unit, the propelled motion of the second unmanned vehicle to position the image detector such as to register the spatial distribution of the penetrating radiation when transmitted through the target object.

The method also comprises acquiring at least two images using the image detector, wherein the propelled motion of the first unmanned vehicle and of the second unmanned vehicle are controlled such that the at least two images correspond to at least two different projection directions of the penetrating radiation through the target object.

The method further comprises generating data representative of an internal structure of the target object from the at least two images, using the processing unit.

In a method in accordance with embodiments of the present invention, the controlling of the propelled motion of the first and second unmanned vehicle may take positioning information provided by the positioning unit into account.

A method in accordance with embodiments of the present invention, may further comprise determining the position of the target object by the positioning unit, and this controlling of the propelled motion of the first unmanned vehicle and of the second unmanned vehicle may take the position of the target object into account, e.g. as determined by the positioning unit.

In a method in accordance with embodiments of the present invention, the propelled motion of the first unmanned vehicle and the second unmanned vehicle may be controlled such as to acquire the at least two images corresponding to the at least two different projection directions, in which the at least two different projection directions are determined by the processing unit as a uniform angular sampling around the target object.

In a method in accordance with embodiments of the present invention, the generating of the data representative of the internal structure of the target object may comprise a tomographic reconstruction.

In a method in accordance with embodiments of the present invention, this tomographic reconstruction may comprise a partial reconstruction taking a first plurality of images into account, in which the method may further comprise determining a further projection direction for acquiring a further image of the target object by taking this partial reconstruction into account.

In a method in accordance with embodiments of the present invention, the tomographic reconstruction may be performed by the processing unit using a discrete algebraic reconstruction method.

In a method in accordance with embodiments of the present invention, the tomographic reconstruction may comprise a compensation method for taking unpredictable variations in positioning of the first unmanned vehicle, the second unmanned vehicle and/or the target object into account.

In a further aspect, embodiments of the present invention relate to a computer program product for, if executed by a processing unit, performing steps of a method in accordance with embodiments of the second aspect of the present invention. These performed steps comprise at least the controlling of a propelled motion of a first unmanned vehicle, the controlling of the propelled motion of a second unmanned vehicle and the generating of data representative of an internal structure of a target object from at least two acquired images.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

The drawings are only schematic and are non-limiting. In the drawings, the size of some of the elements may be exaggerated and not drawn on scale for illustrative purposes.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Where in the present description is referred to an unmanned vehicle, reference is made to an uncrewed vehicle or unmanned vehicle that can operate without a human operator on board. Particularly, in the present disclosure, such unmanned vehicle refers to a vehicle capable of sensing its environment and navigating in response to control instructions from a processing unit in accordance with embodiments of the present invention. These control instructions may be determined by the processing unit without human intervention, e.g. hence the reference to 'autonomous', which should be interpreted in the context of the system as a whole and not necessarily to the vehicle as an independent unit as such. The vehicle may be ground vehicle, water vehicle, air vehicle or space vehicle, but may explicitly exclude mobile machines adapted for moving along a fixed track, e.g. having only a single degree of freedom of translation, which are thus not considered as unmanned vehicles in the context of present disclosure.

In a first aspect, the present invention relates to a system for imaging a target object. This system comprises a first unmanned vehicle and a second unmanned vehicle. The first and second unmanned vehicle are each an autonomous vehicle, adapted for independent propelled motion. Furthermore, each of the first and the second unmanned vehicle comprises a positioning unit for detecting a position of the corresponding vehicle, e.g. a navigation unit for controlling the motion of the unmanned vehicle in response to a detected position of the vehicle.

The first unmanned vehicle comprises a source of penetrating radiation, and this first unmanned vehicle is adapted for positioning the source such as to direct the penetrating radiation toward the target object. The second unmanned vehicle comprises an image detector for registering a spatial distribution of the penetrating radiation as an image. This second unmanned vehicle is adapted for positioning the image detector such as to register the spatial distribution of the penetrating radiation when transmitted through the target object.

The system also comprises a processing unit, e.g. a processor, for controlling the propelled motion of respectively the first and the second unmanned vehicle such as to acquire at least two images using the image detector. These at least two images correspond to at least two different projection directions of the penetrating radiation through the target object. The processing unit is further adapted for generating data representative of an internal structure of the target object from the at least two images.

Figure 1:
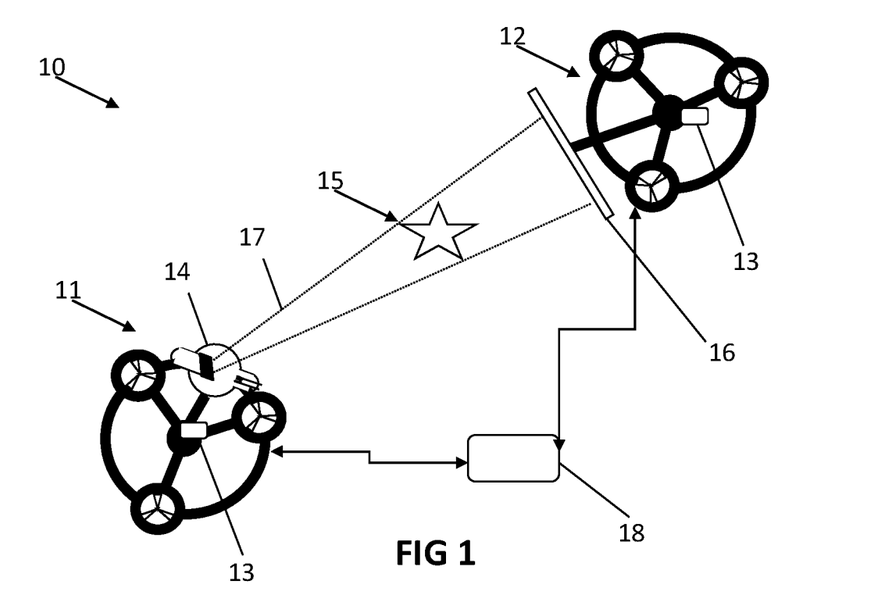
FIG. 1 shows an exemplary system for imaging a target object in accordance with embodiments of the present invention.
Figure 2:
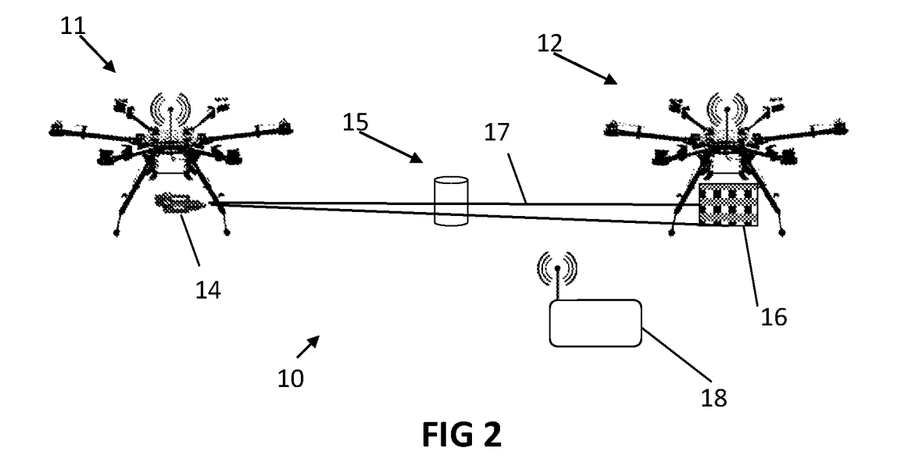
FIG. 2 shows another exemplary system for imaging a target object in accordance with embodiments of the present invention.

Referring to FIG. 1 and FIG. 2, exemplary systems 10 in accordance with embodiments of the present invention are shown schematically. Such system 10 is adapted for imaging a target object 15. For example, the target object may be difficult to reach by conventional imaging systems, e.g. a blade of a wind turbine, a submerged object, a conduit or device in a crawl space, a monumental piece of art, an object in a hazardous environment, such as a vacuum, toxic or irradiated environment, and/or an archaeological artifact in an unstable and/or delicate excavated building.

This system 10 comprises a first unmanned vehicle 11 and a second unmanned vehicle 12. The first unmanned vehicle 11, respectively the second unmanned vehicle 12, is an autonomous vehicle adapted for independent propelled motion. Particularly, the first and/or second unmanned vehicle may be adapted for autonomous movement in at least two dimensions, e.g. allowing substantially unconstrained translation in at least two dimensions, for example for autonomous movement three dimensions, e.g. allowing substantially unconstrained translation in three dimensions. The first and/or second unmanned vehicle may allow, in addition to an autonomous translation movement, a rotation movement of at least a part thereof, e.g. a rotation of a radiation source of the first unmanned vehicle and/or a rotation of a detector of the second unmanned vehicle. This rotation movement may be a rotation around a single axis of rotation, around a pair of orthogonal axes or three orthogonal axes. For example, the unmanned vehicle may allow a substantially unconstrained positioning and orienting of a component, e.g. the source, respectively the detector, providing six degrees of freedom, e.g. three degrees of freedom of translation and three degrees of freedom of rotation.

For example the vehicle 11,12 may comprise a propulsion system, such as at least one propulsion engine, wheels, rotors, fluid jet outlets or a combination thereof. For example, each vehicle 11,12 may be a ground vehicle, aerial vehicle, space craft, watercraft, e.g. a boat, ship or hovercraft, and/or submersible vehicle. The vehicle 11,12 may be a drone. Each vehicle 11,12 may comprise a power source for sustaining the propelled motion, e.g. a combustion fuel tank, fuel cell, battery and/or solar power module.

Furthermore, each of the first and the second unmanned vehicle 11,12 comprises a positioning unit 13 for detecting a position of the corresponding vehicle 11,12. The vehicle 11,12 may comprise a navigation unit for controlling the motion of the unmanned vehicle in response to a detected position of the vehicle, e.g. as supplied by the positioning unit 13. The positioning unit 13 may comprise an indoor positioning system for locating the vehicle inside a building, and/or an outdoor positioning system for locating the vehicle, e.g. with respect to global coordinate system. The positioning unit may use radio waves, magnetic fields, acoustic signals, optical imaging, or other sensory information to determine a position of the vehicle with respect to a reference coordinate system. The positioning unit may comprise laser positioning and/or echo positioning to measure a distance with respect to objects in its vicinity. The reference coordinate system may be provided by anchor nodes with known position, such as global positioning system (GPS) satellites, cellular telephone network stations, WiFi access points or markers. The positioning system may furthermore be adapted for determining a relative position with respect to the target object 15 and/or the other vehicle. The positioning system may perform a trilateration operation to determine the position of the corresponding vehicle, the object and/or the other vehicle.

The first unmanned vehicle 11 comprises a source 14 of penetrating radiation, for example a Röntgen tube, e.g. an X-ray tube, or a gamma radiation source. For example, the source 14 may be a compact source of penetrating radiation, such as the XRS-3 lightweight X-ray tube, commercially available from Golden Engineering, Centerville, USA. The first unmanned vehicle 11 is adapted for positioning the source 14 such as to direct the penetrating radiation toward the target object 15. For example, the unmanned vehicle 11 may position itself at a position such as to direct the radiation emissions, e.g. a cone of radiation, toward the object 15 to be imaged. Furthermore, the first unmanned vehicle 11 may comprise a pivotable support, e.g. at least one gimbal, that allows rotation of the source 14 about at least one axis of rotation. For example, two or three gimbals, mounted on to the other with orthogonal pivot axes, may be provided to improve stability of the source 14 under movement of the vehicle 11, and/or to provide an accurate control of the emission direction of the penetrating radiation.

The second unmanned 12 vehicle comprises an image detector 16 for registering a spatial distribution of the penetrating radiation as an image. This second unmanned vehicle 12 is adapted for positioning the image detector 16 such as to register the spatial distribution of the penetrating radiation 17 when transmitted through the target object 15.

For example, the image detector 16 may be a light-weight, small X-ray digital image sensor, e.g. comprising a photodiode array. Such photodiode array may have a detector surface area of less than or equal to 1 m$^2$, e.g. less than or equal to 30 cm×30 cm, e.g. less than or equal to 20 cm×20 cm, such as, for example 120 mm by 120 mm, or even less, e.g. less than or equal to 10 cm×10 cm. This image detector 16 may comprise an array of pixels, e.g. at least 100 by 100 pixels, e.g. at least 500 by 500 pixels, or at least 1000 by 1000 pixels, e.g. 2400 by 2400 pixels, or even a larger number of pixels, e.g. 10000 by 10000 pixels. Each pixel may be adapted for quantifying the amount of radiation incident thereon, e.g. using a digital output value, such as a 4 bit value, an 8 bit value, a 12 bit value, a 16 bit value, a 24 bit value, a 32 bit value, or even a higher analog-to-digital conversion resolution. Particularly, the detector may have a suitably high dynamic range, e.g. in combination with low noise characteristics. For example, the C7942CA-22 may be a suitable, commercially available image detector, available from Hamamatsu Photonics, Shizuoka Pref., Japan.

Furthermore, the second unmanned vehicle 12 may comprise a pivotable support, e.g. at least one gimbal, that allows rotation of the image detector 16 about at least one axis of rotation. For example, two or three gimbals, mounted on to the other with orthogonal pivot axes, may be provided to improve stability of the image detector 16 under movement of the vehicle 12, and/or to provide an accurate control of the image plane orientation with respect to the incident penetrating radiation.

The system also comprises a processing unit 18, e.g. a processor, for controlling the propelled motion of respectively the first and the second unmanned vehicle 11,12 such as to acquire at least two images using the image detector 16. For example, the processor may comprise a computer, an application specific integrated circuit, a field programmable gate array and/or a microprocessor, programmed and/or configured for controlling the motion of the unmanned vehicles. For example, the processing unit may comprise a digital storage memory, input and/or output means, and/or a communication module. The processing unit may be integrated in the first unmanned vehicle 11, in the second unmanned vehicle 12, or in a separate base station. Furthermore, the processing unit may comprise different components, e.g. a first component integrated in the first unmanned vehicle 11 and a second component integrated in the second unmanned vehicle 12, which are adapted for exchanging data, e.g. over a wireless communication link.

The processing unit may be adapted for receiving position information from the first and/or second unmanned vehicle 11,12, identifying a position of the vehicle with respect to a common position reference. The processing unit may be adapted for sending control instructions to the first and/or second unmanned vehicle 11, 12 to adjust the position of the vehicle to a target location.

For example, the processing unit 18 may be adapted for receiving, e.g. as user input or via an external control interface, an indicative position of the target object 15, or an indicative position of the target object may be predetermined, e.g. stored as a configuration parameter in a memory accessible to the processing unit. Likewise, a spatial extent of the object may be received, or known as a predetermined parameter. In response to this information, the processing unit may determine a first position for the first unmanned vehicle 11 and a second position for the second unmanned vehicle 12, such that radiation emitted by the source mounted on the first unmanned vehicle target impinges on the detector mounted on the second unmanned vehicle, and the target object 15 may be assumed to be positioned in between the first and the second unmanned vehicle, such that the penetrating radiation impinging on the detector 16 varies as function of position on the imaging detector due to an interaction between the penetrating radiation and the structure of the target object.

Alternatively, the first and/or second unmanned vehicle 11,12 may comprise a position detector for determining the position of the target object when present. For example, an laser range finder, a camera with image recognition system, an echo-locator or a radio detector may be provided on one or each of the vehicles 11,12 to detect the presence of the target object, and for transmitting an indicative position of the object to the processing unit when the presence of this object is detected. Thus, the system may be adapted for finding the target object, e.g. as identified by recognition of its appearance in a camera image, the presence of a marker, or other suitable detection mechanism known in the art. The processing unit may then respond to such indicative position by controlling the movement of the first and second unmanned vehicle, e.g. similarly as described hereinabove where such information was predetermined or received as input from a user.

When the first and second unmanned vehicle have reached the target position, as controlled by the processing unit, an image may be acquired by the detector. For example, the processing unit may control the source to emit radiation and, simultaneously, the detector to acquire an image. This image may be transmitted by the detector to the processing unit.

As described hereinabove, the processing unit 18 is adapted for controlling the propelled motion of respectively the first and the second unmanned vehicle 11,12 such as to acquire at least two images using the image detector 16. For example, after acquiring the first image, as described hereinabove. These at least two images correspond to at least two different projection directions of the penetrating radiation through the target object.

The processing unit may thus be adapted for sending control instructions to the first and/or second unmanned vehicle 11, 12, after acquiring the first image, to adjust the position of the vehicles to second target locations. As mentioned hereinabove, the processing unit 18 may have access to an indicative position of the target object 15, as predetermined, received from a user or inferred from sensor data received from the first and/or second unmanned vehicle 11,12. Taking this information and the first locations that the first, respectively the second, unmanned vehicle where positioned in to acquire the first image into account, the processing unit may determine a second position for the first unmanned vehicle 11 and a second position for the second unmanned vehicle 12, such that radiation emitted by the source mounted on the first unmanned vehicle target impinges on the detector mounted on the second unmanned vehicle, and the target object 15 may be assumed to be positioned in between the first and the second unmanned vehicle, such that the penetrating radiation impinging on the detector 16 varies as function of position on the imaging detector due to an interaction between the penetrating radiation and the structure of the target object. When the first and second unmanned vehicle have reached the second positions, as controlled by the processing unit, a second image may be acquired by the detector. For example, the processing unit may control the source to emit radiation and, simultaneously, the detector to acquire the second image, which may be transmitted by the detector to the processing unit. These second positions may be determined by the processing unit such as to differ sufficiently from the first positions, such that the first and second image, and optionally in further iterations any further image, correspond to at least two different projection directions of the penetrating radiation through the target object.

The processing unit 18 is further adapted for generating data representative of an internal structure of the target object from the at least two images. For example, the processing unit may perform a three-dimensional reconstruction, e.g. a tomographic reconstruction, of the target object 15. For example, the plurality of images may correspond to projection directions around the object that constitute a uniform angular sampling over an angle of at least 180°, e.g. an angle of 180° plus the fan-angle of the spatial configuration. However, embodiments of the present invention are not limited to such conventional computed tomography acquisitions. For example, the control unit may perform a partial reconstruction when a first plurality of images has been obtained, and determine a next projection angle in order to maximize the expected information content of a next image to be acquired.

The processing unit may perform an algebraic reconstruction method for reconstructing the internal structure of the object from a plurality of images, for example a discrete algebraic reconstruction method. A dynamic angle selection method may be applied to determine a sequence of projection angles for acquiring the at least two images. Furthermore, a variable distance approach may be applied. The determining of the positions of the first and second unmanned vehicle to define a projection for acquiring any of the images may also be subject to additional constraints. For example, physical constraints of the movement of the unmanned vehicles may be taken into account, e.g. constraints representative of obstructions, such as walls or other confinements of the range of motion. Such physical constraints may be received from at least one sensor integrated in the first and/or second unmanned vehicle, e.g. an echo-location sensor, camera system with a suitable image recognition system and/or a laser rangefinder. Alternatively or additionally, the processing unit may have access to a model of the physical space in which the unmanned vehicles operate, e.g. as received from a user input or pre-stored in an integrated memory or on removable data carrier. In embodiments of the present invention, the processing unit may implement a method as disclosed in "Towards in loco X-ray computed tomography," a doctoral thesis by Andrei Dabravolski, publicly available online via http://anet.uantwerpen.be/docman/irua/c3935c/11225.pdf, and from the Universiteit Antwerpen Library, Antwerp, Belgium (see library reference http://hdl.handle.net/10067/1305000151162165141).

The contents of this prior disclosure by Dabravolski is hereby incorporated by reference. Particular features of this disclosure that may be incorporated can be found in sections 2.2, 3.2 and 4.2, which may be implemented in isolation or in combination in embodiments of the present invention, embodiments of the present invention not necessarily being limited by the disclosure in these explicitly referenced sections alone.

The processing unit may also be adapted for taking small variations in positioning of the unmanned vehicles 11,12 into account. For example, while the processing unit may control the movement of the unmanned vehicles 11,12 to determined locations, the final position reached by the unmanned vehicles 11,12 may be inaccurate, due to, for example, measurement errors of positioning sensors. The processing unit may therefore apply an alignment method when generating the data representative of the internal structure of the target object, e.g. a tomographic reconstruction. Such alignment methods are known in the art, e.g. as disclosed by Folkert Bleichrodt et al. in "An alignment method for fan beam tomography," proceedings of the 1$^{st}$ International Conference on Tomography of Materials and Structures (ICTMS) 2013, p. 103-106. The contents of this disclosure by Bleichrodt et al. is hereby incorporated by reference. Particularly, a method as disclosed in section 2 of this paper may be implemented by the processing unit in accordance with embodiments of the present invention, embodiments of the present invention not necessarily being limited to features disclosed in this section alone. Furthermore, where the prior art disclosure assumes fixed and known positions of the detector and radiation source, while the object may be subject to small and unpredictable motion in between projection image acquisitions, the skilled person will understand that the disclosed approach is not necessarily limited thereto, and may, for example, equally apply to unpredictable variations in position of the source, the detector or the object, or any combination thereof.

However, the processing unit 18 may, additionally or alternatively, be adapted for generating the data representative of the internal structure of the target object from the at least two images using a model of the internal structure of the target object. For example, the at least two projection images may be compared to a simulated radiograph determined from such model to identify internal features of the target object, e.g. to identify a corresponding feature in each of the plurality of projection images.

In a second aspect, the present invention also relates to a method for imaging a target object. This method comprises providing a first unmanned vehicle comprising a source of penetrating radiation, and providing a second unmanned vehicle comprising an image detector for registering a spatial distribution of the penetrating radiation as an image. This first and second unmanned vehicle are autonomous vehicles adapted for independent propelled motion, and the first and the second unmanned vehicle comprise a positioning unit for detecting a position of the corresponding vehicle. The method further comprises controlling, using a processing unit, the propelled motion of the first unmanned vehicle to position the source such as to direct the penetrating radiation toward the target object. The method also comprises controlling, using the processing unit, the propelled motion of the second unmanned vehicle to position the image detector such as to register the spatial distribution of the penetrating radiation when transmitted through the target object.

The method further comprises acquiring at least two images using the image detector, wherein the propelled motion of the first unmanned vehicle and of the second unmanned vehicle is controlled such that the at least two images correspond to at least two different projection directions of the penetrating radiation through the target object. The method also comprises generating data representative of an internal structure of the target object from the at least two images, using the processing unit.

A method in accordance with embodiments of the present invention may relate to the operation of a system in accordance with embodiments of the present invention. Details of a method in accordance with embodiments of the second aspect of the present invention may therefore be clear from the description provided hereinabove relating to embodiments of the first aspect of the present invention.

Figure 3:
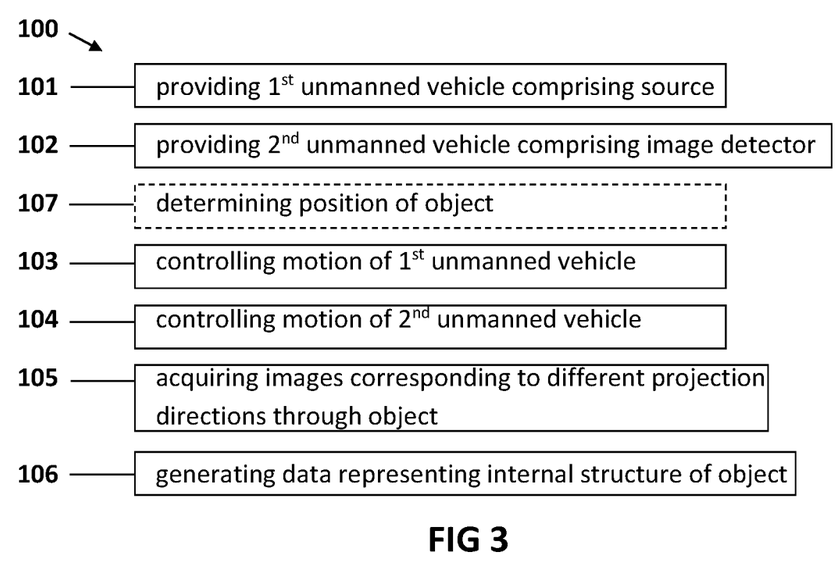
FIG. 3 illustrates an exemplary method for imaging a target object in accordance with embodiments of the present invention.

Referring to FIG. 3, an exemplary method 100 for imaging a target object in accordance with embodiments of the present invention is illustrated. The method 100 comprises providing 101 a first unmanned vehicle 11 that comprises a source 14 of penetrating radiation, and providing 102 a second unmanned vehicle 12 that comprises an image detector 16 for registering a spatial distribution of the penetrating radiation as an image. The first and the second unmanned vehicle are autonomous vehicles adapted for independent propelled motion, and each of the first and the second unmanned vehicle comprises a positioning unit 13 for detecting a position of the corresponding vehicle.

The method 100 further comprises controlling 103, using a processing unit 18, the propelled motion of the first unmanned vehicle 11 to position the source 14 such as to direct the penetrating radiation 17 toward the target object 15, and controlling 104, using this processing unit 18, the propelled motion of the second unmanned vehicle 12 to position the image detector such as to register the spatial distribution of the penetrating radiation when transmitted through the target object 15.

The steps of controlling 103 the first unmanned vehicle motion and controlling 104 the second unmanned vehicle motion may advantageously take positioning information provided by the positioning unit 13 into account, e.g. positioning information provided by the positioning unit of the first unmanned vehicle and/or provided by the positioning unit of the second unmanned vehicle.

The method 100 may for example comprise a step of determining 107 the position of the target object 15 by the positioning unit, e.g. by processing information provided by the positioning unit in the processing unit 18. This position of the target object may be determined relative to the first unmanned vehicle and/or the second unmanned vehicle, or may be determined in an absolute coordinate reference frame. However, in a method in accordance with embodiments of the present invention, the position of the target object may alternatively be known a-priori, or provided as an input, e.g. by a user.

Controlling 103,104 the propelled motion of the first unmanned vehicle and of the second unmanned vehicle may take the position of the target object 15 into account, e.g. regardless of whether this position information is determined from sensor data provided by the positioning unit 13, is predetermined or is provided as input to the method by other means.

The method also comprises a step of acquiring 105 at least two images using the image detector 16, wherein the propelled motion of the first unmanned vehicle 11 and of the second unmanned vehicle 12 is controlled 103,104 such that the at least two images correspond to at least two different projection directions of the penetrating radiation through the target object 15.

For example, the propelled motion of the first unmanned vehicle and/or of the second unmanned vehicle may be controlled 103,104 such as to acquire the at least two images corresponding to the at least two different projection directions, in which the at least two different projection directions are determined by the processing unit 18 as a uniform angular sampling around the target object 15.

The method further comprises generating 106 data representative of an internal structure of the target object from the at least two images, using the processing unit 18. For example, generating 106 the data representative of the internal structure of the target object 15 may comprise performing a tomographic reconstruction. Such tomographic reconstruction may comprise a partial reconstruction that takes a first plurality of images of the at least two images into account. Furthermore, the method may comprise determining a further projection direction for acquiring a further image of the target object by taking the partial reconstruction into account.

The tomographic reconstruction may be performed by using a discrete algebraic reconstruction method.

The tomographic reconstruction may comprise applying a compensation method for taking unpredictable variations in positioning of the first unmanned vehicle 11, the second unmanned vehicle 12 and/or the target object 15 into account.

In a third aspect, the present invention also relates to a computer program product for, if executed by a processing unit, e.g. a processing unit in a system in accordance with embodiments of the first aspect of the present invention, performing steps of a method in accordance with embodiments of the second aspect of the present invention. These performed steps comprise at least the steps of controlling 103 a propelled motion of a first unmanned vehicle 11, controlling 104 a propelled motion of a second unmanned vehicle 12 and generating 106 data representative of an internal structure of a target object from at least two acquired images.

The invention claimed is:

1. A system for imaging a target object, said system comprising:
   a first unmanned vehicle comprising a source of penetrating radiation, said first unmanned vehicle being configured to position said source such as to direct said penetrating radiation toward said target object;
   a second unmanned vehicle comprising a detector;
   wherein the first and the second unmanned vehicle are autonomous vehicles configured for independent propelled motion;
   wherein each of the first unmanned vehicle and the second unmanned vehicle comprises a positioning unit that detects a position of the corresponding vehicle;
   the system further comprising a processing unit that controls said propelled motion of the first unmanned vehicle and the second unmanned vehicle, wherein the source of penetrating radiation comprises an X-ray tube for producing X-ray radiation and/or a gamma radiation source, said detector being configured for registering a spatial distribution of intensities of said penetrating radiation after being transmitted through the target object, the spatial distribution being referred to as an image, and the processing unit being configured for controlling the propelled motion of the first and the second unmanned vehicle such as to acquire at least two images, using said detector, corresponding to at least two different projection directions of said penetrating radiation through the target object;
   wherein said processing unit is further configured to generate data representative of an internal structure of said target object from said at least two images.

2. The system according to claim 1, wherein the first unmanned vehicle and/or the second unmanned vehicle comprises a propulsion system for providing said propelled motion and a power source for sustaining said propelled motion.

3. The system according to claim 1, wherein the first unmanned vehicle and/or the second unmanned vehicle is a ground vehicle, an aerial vehicle, a space craft, a watercraft and/or a submersible vehicle.

4. The system according to claim 1, wherein said positioning unit comprises an indoor positioning system and/or an outdoor positioning system, and is configured to use laser positioning and/or echo positioning to measure a distance with respect to objects in its vicinity and/or is configured for determining a relative position of said unmanned vehicle in which it is comprised with respect to the target object and/or the other unmanned vehicle.

5. The system according to claim 1, in which the first unmanned vehicle comprises a pivotable support for allowing a rotation of the source and/or wherein the second unmanned vehicle comprises a pivotable support for allowing a rotation of the image detector.

6. The system according to claim 1, wherein said processing unit is, fully or in part, integrated in the first unmanned vehicle, the second unmanned vehicle and/or a separate base station.

7. The system according to claim 1, wherein said positioning unit determines the position of the target object when present and wherein said first and/or second unmanned vehicle transmit an indicative position of the target object to the processing unit when the presence of said target object is detected by said positioning unit.

8. The system according to claim 1, in which said processing unit controls said independent propelled motion of the first and the second unmanned vehicle such as to acquire said at least two images, using said image detector, corresponding to at least two different projection directions of said penetrating radiation through the target object, wherein said at least two different projection directions are determined by the processing unit as a uniform angular sampling around said target object.

9. The system according to claim 1, in which said processing unit generates said data representative of said internal structure of said target object by performing a tomographic reconstruction.

10. The system according to claim 9, in which said tomographic reconstruction comprises a partial reconstruction taking a first plurality of images into account, and in which said processing unit furthermore determines a further projection direction for acquiring a further image of the target object by taking said partial reconstruction into account and/or wherein said tomographic reconstruction is performed by said processing unit using a discrete algebraic reconstruction method and/or wherein said tomographic reconstruction comprises a compensation method for taking unpredictable variations in positioning of the first unmanned vehicle, the second unmanned vehicle and/or the target object into account.

11. A method for imaging a target object, said method comprising:
   providing a first unmanned vehicle comprising a source of penetrating radiation, and providing a second unmanned vehicle comprising a detector, wherein the first and the second unmanned vehicle are autonomous vehicles configured for independent propelled motion, and wherein each of the first and the second unmanned vehicle comprises a positioning unit configured to detect a position of the corresponding vehicle;

controlling, using a processing unit, said propelled motion of the first unmanned vehicle to position said source such as to direct said penetrating radiation toward said target object;

controlling, using said processing unit, said propelled motion of the second unmanned vehicle to position said detector for registering when transmitted through said target object;

wherein said penetrating radiation is X-ray radiation and/or gamma radiation, and said detector is a detector configured for registering a spatial distribution of intensities of said penetrating radiation after being transmitted through the target object, the spatial distribution being referred to as an image;

acquiring at least two images using said image detector, wherein said propelled motion of the first unmanned vehicle and of the second unmanned vehicle is controlled such that said at least two images correspond to at least two different projection directions of said penetrating radiation through the target object; and generating data representative of an internal structure of said target object from said at least two images, using said processing unit.

12. The method according to claim 11, wherein said controlling of the propelled motion of the first and second unmanned vehicle takes into account positioning information provided by said positioning unit and/or wherein the method further comprises determining the position of said target object by said positioning unit, and wherein said controlling of the propelled motion of the first unmanned vehicle and of the second unmanned vehicle takes said position of said target object into account, and/or wherein said propelled motion of the first and the second unmanned vehicle is controlled such as to acquire said at least two images corresponding to said at least two different projection directions, in which the at least two different projection directions are determined by the processing unit as a uniform angular sampling around said target object.

13. The method according to claim 11, in which said generating of said data representative of said internal structure of said target object comprises a tomographic reconstruction.

14. The method according to claim 11, in which said tomographic reconstruction comprises a partial reconstruction taking a first plurality of images into account, said method further comprising determining a further projection direction for acquiring a further image of the target object by taking said partial reconstruction into account, and/or wherein said tomographic reconstruction is performed by said processing unit using a discrete algebraic reconstruction method and/or wherein said tomographic reconstruction comprises a compensation method for taking unpredictable variations in positioning of the first unmanned vehicle, the second unmanned vehicle and/or the target object into account.

15. A computer program product for, if executed by a processing unit, performing steps of a method in accordance with claim 11, said performed steps comprising said controlling of a propelled motion of a first unmanned vehicle, said controlling of a propelled motion of a second unmanned vehicle and said generating of data representative of an internal structure of a target object from at least two acquired images.

* * * * *